United States Patent
Ota et al.

(10) Patent No.: US 6,945,847 B2
(45) Date of Patent: Sep. 20, 2005

(54) METHOD OF LAPPING MEDIUM-OPPOSING SURFACE IN THIN-FILM MAGNETIC HEAD

(75) Inventors: Norikazu Ota, Tokyo (JP); Takehiro Kamigama, Tokyo (JP); Nobuya Oyama, Tokyo (JP); Soji Koide, Tokyo (JP); Tetsuro Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/790,794

(22) Filed: Mar. 3, 2004

(65) Prior Publication Data

US 2004/0235394 A1 Nov. 25, 2004

(30) Foreign Application Priority Data

Mar. 4, 2003 (JP) .................................... P2003-057436

(51) Int. Cl.⁷ ............................ B24B 49/00; B24B 1/00
(52) U.S. Cl. .................................... 451/7; 451/54
(58) Field of Search ..................... 451/7, 5–10, 53–54, 451/41; 360/317, 126; 29/603.08, 603.13, 603.07

(56) References Cited

U.S. PATENT DOCUMENTS

| 6,074,283 | A | * | 6/2000 | Maeda et al. ................ 451/53 |
| 6,414,818 | B1 | | 7/2002 | Tanimoto et al. |
| 6,604,989 | B2 | * | 8/2003 | Yanagida et al. ........... 451/272 |
| 2001/0013997 | A1 | * | 8/2001 | Sasaki et al. ............... 360/317 |
| 2002/0155794 | A1 | * | 10/2002 | Fatula et al. ................. 451/53 |
| 2004/0027728 | A1 | * | 2/2004 | Coffey et al. ............... 360/313 |
| 2004/0154159 | A1 | * | 8/2004 | Sasaki et al. ............ 29/603.07 |
| 2004/0235394 | A1 | * | 11/2004 | Ota et al. ...................... 451/7 |
| 2004/0259474 | A1 | * | 12/2004 | Oyama et al. ................. 451/5 |

* cited by examiner

*Primary Examiner*—Lee D. Wilson
(74) *Attorney, Agent, or Firm*—Oliff & Berridge, PLC

(57) ABSTRACT

A thin-film magnetic head is formed on a support and is provided with a reproducing head part, a recording head part, and a heater for generating heat upon energization. A medium-opposing surface S of the magnetic head is polished while energizing the heater or recording head part.

12 Claims, 18 Drawing Sheets

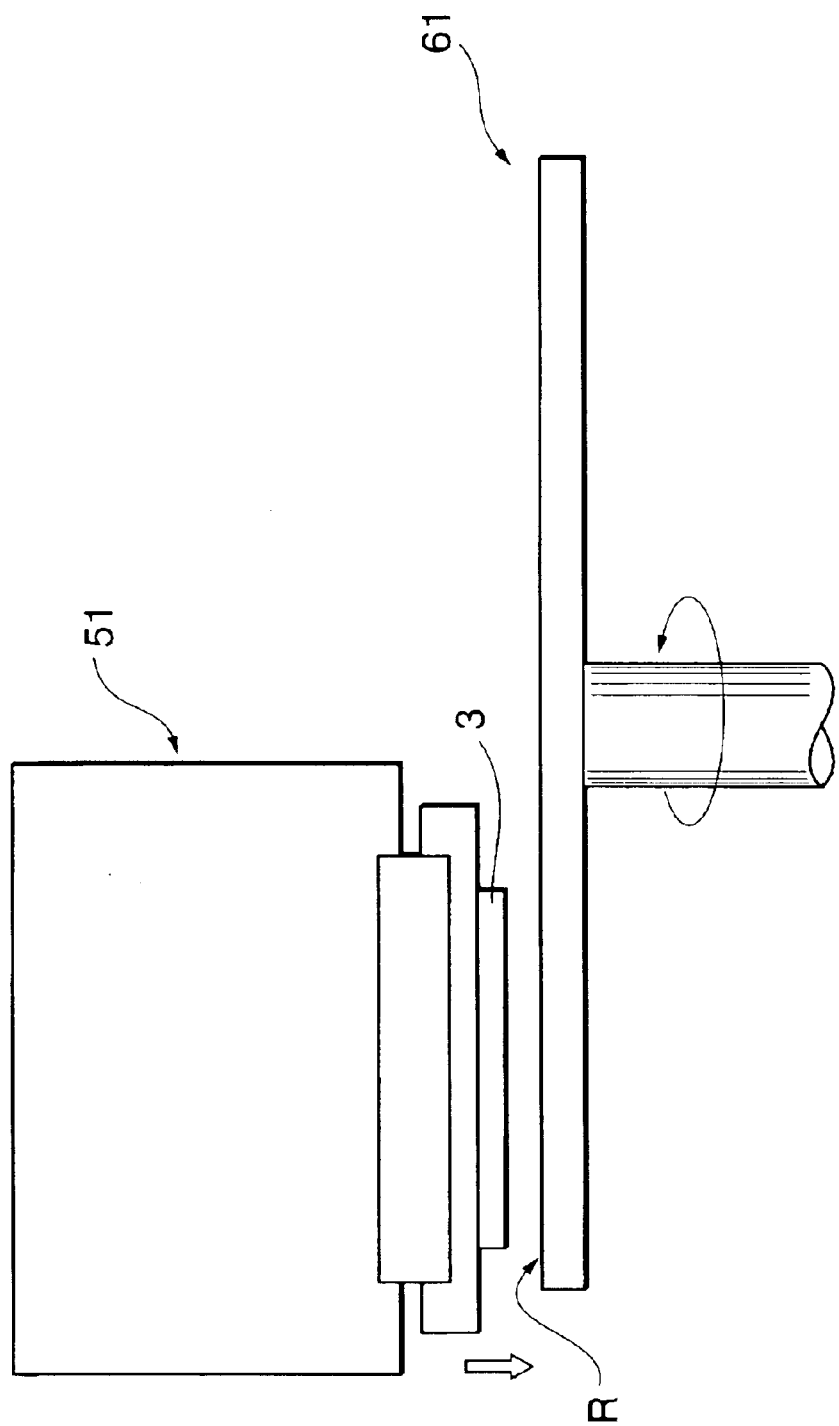

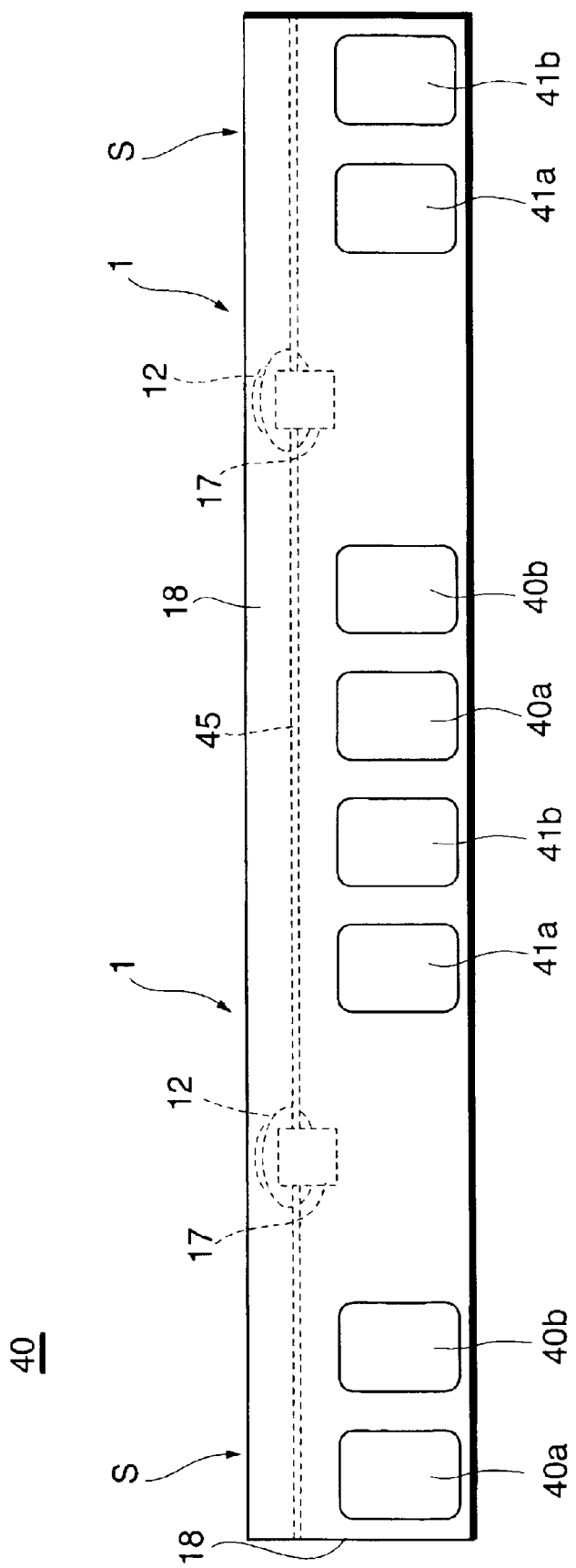

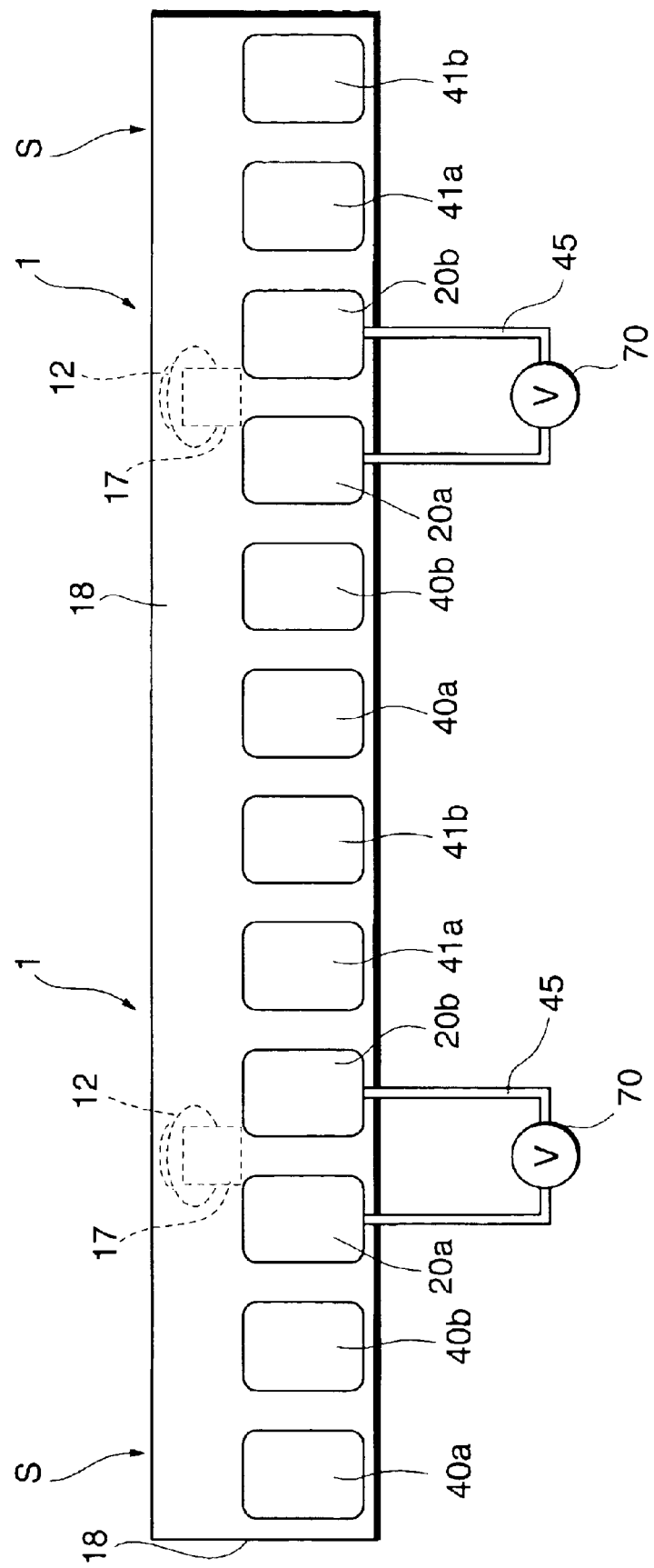

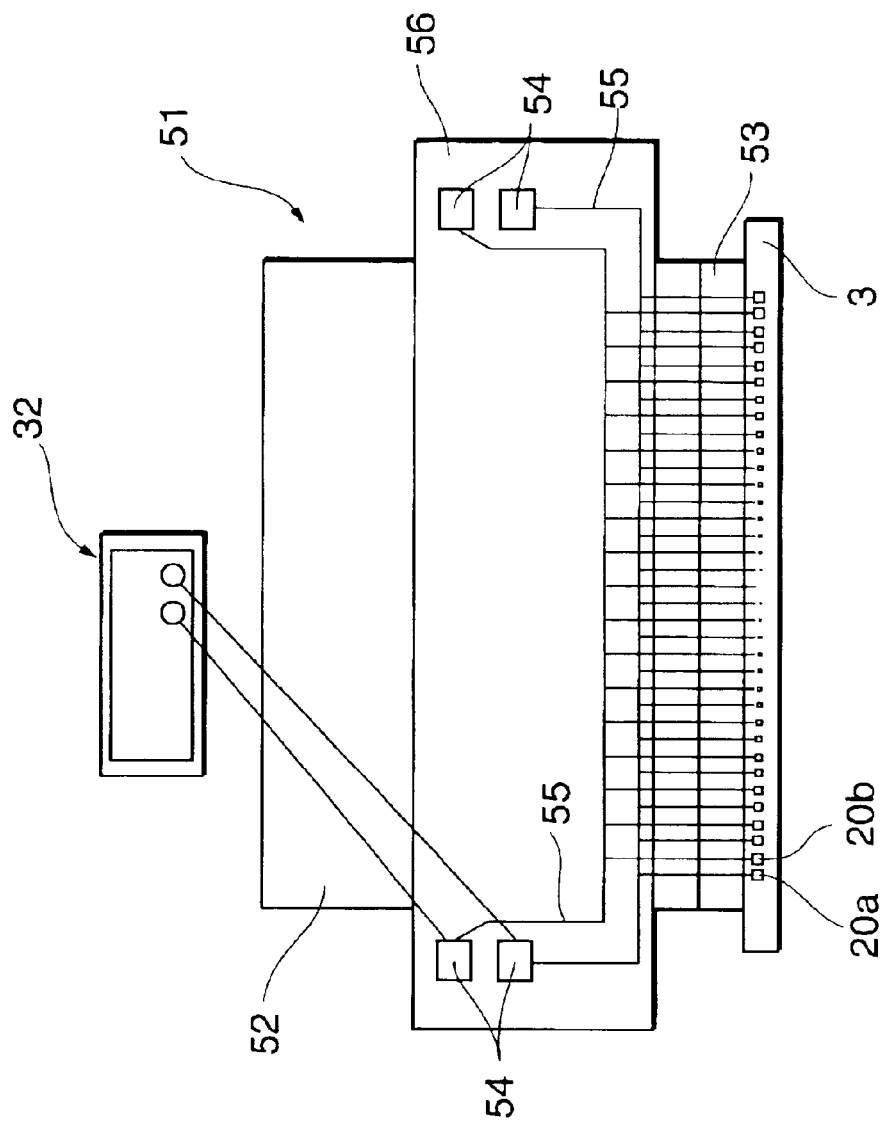
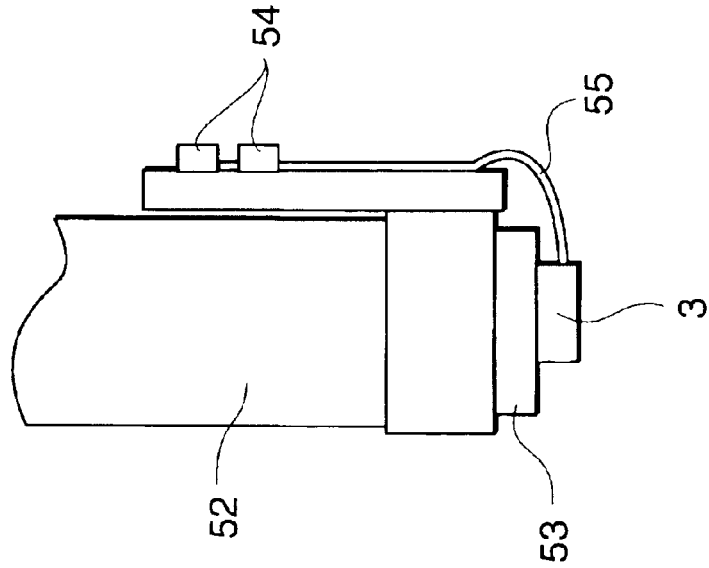

METHOD OF LAPPING MEDIUM-OPPOSING SURFACE IN THIN-FILM MAGNETIC HEAD

BACKGROUND OF THE INVENTION

1. Field of the Invention

The present invention relates to a method of lapping a medium-opposing surface in a thin-film magnetic head.

2. Related Background Art

In general, a head gimbal assembly (HGA) is constructed by attaching a head slider formed with a thin-film magnetic head to a leading end of a flexible arm member such as a suspension. This head gimbal assembly is built into a hard disk drive and carries out recording/reproducing with respect to a hard disk which is a recording medium. At the time of recording/reproducing, an airflow accompanying the rotation of the hard disk occurs under the thin-film magnetic head, thereby levitating the thin-film magnetic head. As the hard disk attains a higher density, the gap between the thin-film magnetic head and hard disk, i.e., head flying height, has been decreasing to 10 nm, which currently seems to be the limit.

Under such circumstances, in a combination thin-film magnetic head in which a magnetoresistive device for reproducing and an inductive electromagnetic transducer for writing are laminated in this order on a support, a coil constituting the electromagnetic transducer will generate heat when the inductive electromagnetic transducer is energized. Then, the thin-film magnetic head will thermally expand in the vicinity of the electromagnetic transducer in a surface opposing a recording surface of the hard disk in the thin-film magnetic head, i.e., medium-opposing surface (ABS; Air Bearing Surface), thereby projecting toward the hard disk. As a consequence, the gap between the thin-film magnetic head and hard disk may decrease, thereby causing the thin-film magnetic head and hard disk to crush against each other. Therefore, the flying height of the thin-film magnetic head must be kept such that the thin-film magnetic head and hard disk do not crush against each other even when the vicinity of the electromagnetic transducer thermally expands. Hence, it has been difficult for the thin-film magnetic head to fully achieve low levitation.

Known as examples of techniques for achieving lower levitation of the thin-film magnetic head by preventing such a state from happening include one in which the leading end part of an overcoat layer on the medium-opposing surface side in the thin-film magnetic head is partly shaved to yield a step, and one in which the glass transition temperature of a coil constituting the electromagnetic transducer is set to about 70 to 100° C., so as to lower the Young's modulus, thereby reducing the thermal stress occurring in the coil part (see, for example, Japanese Patent Application Laid-Open No. 2000-306215).

SUMMARY OF THE INVENTION

However, the conventional techniques mentioned above may not fully restrain the medium-opposing surface from projecting, and thus are hard to realize further lower levitation in the thin-film magnetic head from now on.

While the inventors have been studying the forming of a heater for adjusting the gap between a magnetoresistive device and a hard disk within the thin-film magnetic head (publicly unknown), the problem mentioned above may occur in this case as well.

It is an object of the present invention to provide a method of lapping a medium-opposing surface in a thin-film magnetic head, which can prevent a thin-film magnetic head and a hard disk from crushing against each other and thereby achieve lower levitation in the thin-film magnetic head.

In a first aspect, the present invention provides a method of lapping a medium-opposing surface in a thin-film magnetic head, the method comprising the steps of preparing a thin-film magnetic head formed on a support, the thin-film magnetic head comprising a magnetoresistive device for reproducing, an inductive electromagnetic transducer for writing, and a heater for generating heat when energized; and polishing the medium-opposing surface of the thin-film magnetic head while energizing the heater.

At the time of actual recording onto a hard disk, the electromagnetic transducer of the thin-film magnetic head generates heat upon energization. As a consequence, layers surrounding the electromagnetic transducer expand, whereby the medium-opposing surface projects. In this aspect of the present invention, before the thin-film magnetic head is built into the hard disk drive, the heater provided with the thin-film magnetic head is caused to generate heat, so as to expand the medium-opposing surface in the vicinity of the electromagnetic transducer, and thus expanded part is polished. Therefore, even if the medium-opposing surface is expanded when the electromagnetic transducer is energized at the time of actual recording onto the hard disk, the flying height of the thin-film magnetic head can be set to an appropriate value. This can prevent the thin-film magnetic head and hard disk from crushing against each other, thereby realizing lower levitation in the thin-film magnetic head.

At the time of actual recording/reproducing with respect to the hard disk, the heater may be used to generate heat, so as to adjust the distance between the magnetoresistive device and hard disk. However, the heat from the heater may cause unintended parts of the thin-film magnetic to expand thermally. Even in such a case, the lapping method in accordance with this aspect of the present invention can eliminate the unintended expanding parts beforehand.

Preferably, in this aspect of the present invention, the magnetoresistive device, inductive electromagnetic transducer, and heater are laminated successively from the support side in the thin-film magnetic head. When the electromagnetic transducer is energized at the time of actual recording/reproducing with respect to the hard disk, the electromagnetic transducer generates heat, so as to expand its surroundings, thereby projecting the medium-opposing surface. Therefore, in the medium-opposing surface at the time of recording/reproducing with respect to the hard disk, the vicinity of the electromagnetic transducer comes the closest to the hard disk.

In this aspect of the present invention, the heater is disposed not in the vicinity of the magnetoresistive device but of the electromagnetic transducer, and is heated, so as to expand the medium-opposing surface near the electromagnetic transducer, whereas thus expanded part is polished. As a consequence, even if the medium-opposing surface expands when the electromagnetic transducer is energized at the time of actual recording onto the hard disk, the flying height of the thin-film magnetic head can be set to an appropriate value. Therefore, the thin-film magnetic head and hard disk can more reliably be prevented from crushing against each other.

The heater may be disposed on a surface of the thin-film magnetic head opposite from the support. This makes it unnecessary for the heater to be formed within the thin-film magnetic head, thus facilitating the making of the thin-film magnetic head.

The method may comprise the steps of cutting the support so as to form a bar including thin-film magnetic heads arranged in a row; and polishing medium-opposing surfaces of the thin-film magnetic heads in the bar while energizing the heater. This makes it possible to lap a plurality of medium-opposing surfaces of thin-film magnetic heads at once, which improves the working efficiency.

In this case, the method may comprise the steps of electrically connecting a plurality of heaters of the thin-film magnetic heads to each other; and polishing the medium-opposing surfaces of the thin-film magnetic heads while energizing all the heaters in the bar with a single power supply. This can polish a plurality of medium-opposing surfaces of thin-film magnetic heads at once by fewer pieces of energizing equipment.

A plurality of heaters of the thin-film magnetic heads in the bar may be energized individually. This allows the medium-opposing surfaces of the thin-film magnetic heads to change their amounts of expansion separately from each other, thus making it possible to adjust amounts of polishing in the individual thin-film magnetic heads. Also, a step of placing the wiring necessary for connecting heaters to each other and the like can be omitted, whereby the making of the thin-film magnetic head becomes easier.

The method may comprise the steps of cutting the support so as to form a bar including thin-film magnetic heads arranged in a row; cutting the bar so as to form a plurality of head sliders each having a thin-film magnetic head; mounting the head slider to an arm member so as to form a head gimbal assembly; and polishing the medium-opposing surface of the thin-film magnetic head in thus obtained state while energizing the heater. This can polish the medium-opposing surface of the thin-film magnetic head in a state closer to the case actually mounted in the hard disk drive, whereby optimal amounts of polishing can be carried out in the individual thin-film magnetic heads. Therefore, the thin-film magnetic head and hard disk can more reliably be prevented from crushing against each other.

In a second aspect, the present invention provides a method of lapping a medium-opposing surface in a thin-film magnetic head, the method comprising the steps of preparing a thin-film magnetic head formed on a support, the thin-film magnetic head comprising a magnetoresistive device for reproducing and an inductive electromagnetic transducer for writing; and polishing the medium-opposing surface of the thin-film magnetic head while energizing the electromagnetic transducer.

At the time of actual recording onto a hard disk, the electromagnetic transducer of the thin-film magnetic head generates heat upon energization. As a consequence, layers surrounding the electromagnetic transducer expand, whereby the medium-opposing surface projects. In this aspect of the present invention, before the thin-film magnetic head is built into the hard disk drive, the electromagnetic transducer is caused to generate heat, so as to expand the medium-opposing surface in the vicinity of the electromagnetic transducer, and thus expanded part is polished. Therefore, even if the medium-opposing surface is expanded when the electromagnetic transducer is energized at the time of actual recording onto the hard disk, the flying height of the thin-film magnetic head can be set to an appropriate value. This can prevent the thin-film magnetic head and hard disk from crushing against each other, thereby realizing lower levitation in the thin-film magnetic head.

The method may comprise the steps of cutting the support so as to form a bar including thin-film magnetic heads arranged in a row; and polishing medium-opposing surfaces of the thin-film magnetic heads in the bar while energizing the electromagnetic transducer. This makes it possible to lap a plurality of medium-opposing surfaces of thin-film magnetic heads at once, which improves the working efficiency.

In this case, the method may comprise the steps of electrically connecting a plurality of electromagnetic transducers of the thin-film magnetic heads to each other; and polishing the medium-opposing surfaces of the thin-film magnetic heads while energizing all the electromagnetic transducers in the bar with a single power supply. This can polish a plurality of medium-opposing surfaces of thin-film magnetic heads at once by fewer pieces of energizing equipment.

A plurality of electromagnetic transducers of the thin-film magnetic heads in the bar may be energized individually. This allows the medium-opposing surfaces of the thin-film magnetic heads to change their amounts of expansion separately from each other, thus making it possible to adjust amounts of polishing in the individual thin-film magnetic heads. Also, a step of placing the wiring necessary for connecting heaters to each other and the like can be omitted, whereby the making of the thin-film magnetic head becomes easier.

The method may comprise the steps of cutting the support so as to form a bar including thin-film magnetic heads arranged in a row; cutting the bar so as to form a plurality of head sliders each having a thin-film magnetic head; mounting the head slider to an arm member so as to form a head gimbal assembly; and polishing the medium-opposing surface of the thin-film magnetic head in thus obtained state while energizing the electromagnetic transducer. This can polish the medium-opposing surface of the thin-film magnetic head in a state closer to the case actually mounted in the hard disk drive, whereby optimal amounts of polishing can be carried out in the individual thin-film magnetic heads. Therefore, the thin-film magnetic head and hard disk can more reliably be prevented from crushing against each other.

BRIEF DESCRIPTION OF THE DRAWINGS

FIG. 8 is a view showing a bar lapping step;

FIG. 10 is a view showing an example of heater energizing mode;

FIG. 11 is a view showing an example of heater energizing mode;

FIGS. 12A and 12B are views showing a bar holding device in the mode shown in FIG. 11;

DESCRIPTION OF THE PREFERRED EMBODIMENTS

In the following, preferred embodiments of the present invention will be explained in detail with reference to the accompanying drawings. Constituents identical to each other will be referred to with numerals identical to each other, without repeating their overlapping explanations.

Figure 1A:
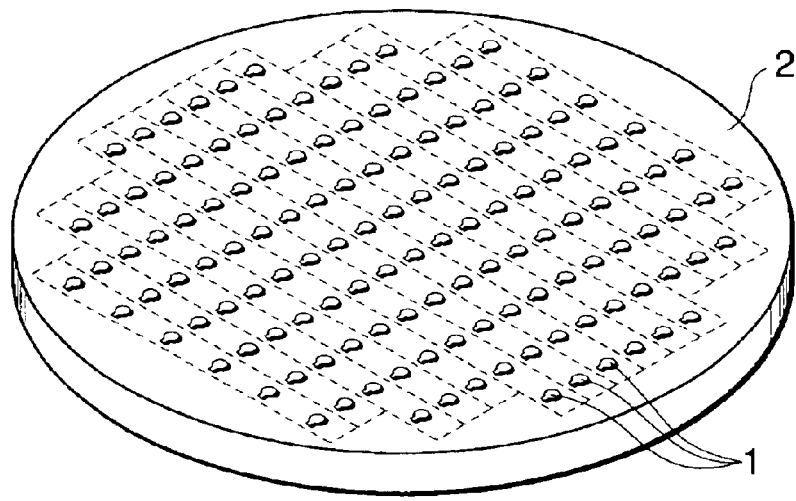
FIG. 1A is a view showing a state in which a plurality of thin-film magnetic heads to which the lapping method in accordance with a first embodiment of the present invention is applied are formed on a support.
Figure 1B:
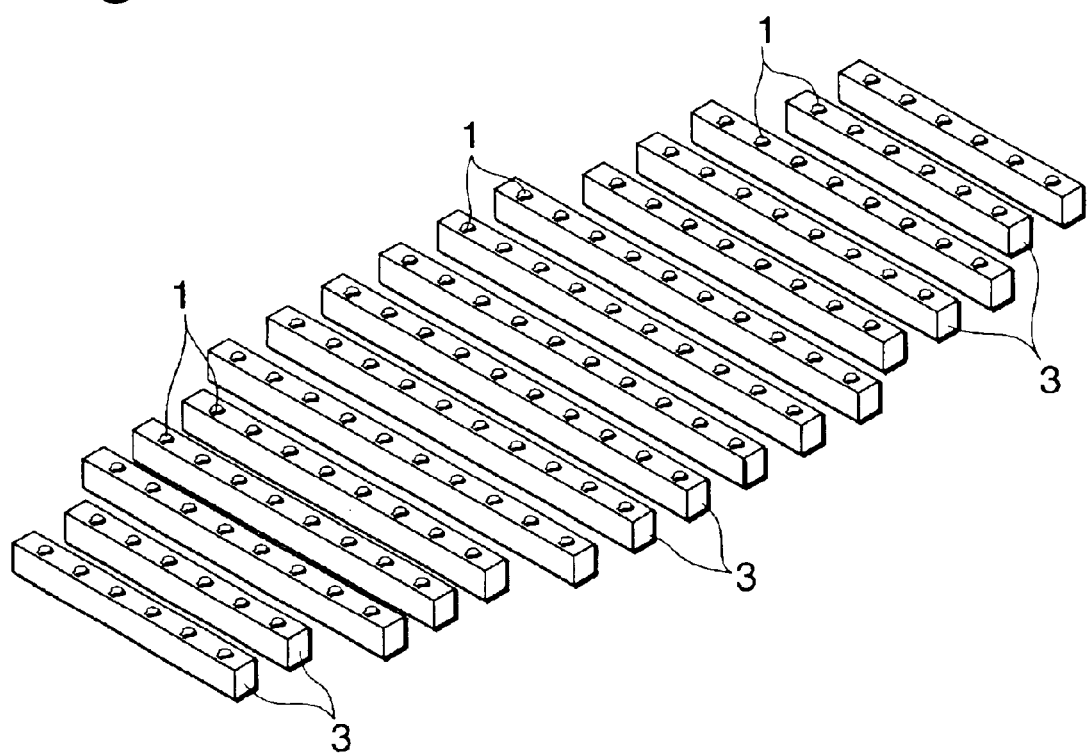
FIG. 1B is a view showing a state in which the support is cut, so as to produce a plurality of bars each including thin-film magnetic heads arranged in a row.

[First Embodiment] FIG. 1A shows a state in which thin-film magnetic heads 1 to which the lapping method in accordance with a first embodiment is applied are formed on a support 2 made of AlTiC (Al$_2$O$_3$.TiC) or the like. FIG. 1B shows a state in which the support 2 is cut, so as to produce a plurality of bars 3 each including the thin-film magnetic heads 1 arranged in a row. After preparing the thin-film magnetic heads 1, the polishing step as described below is performed.

Figure 2:
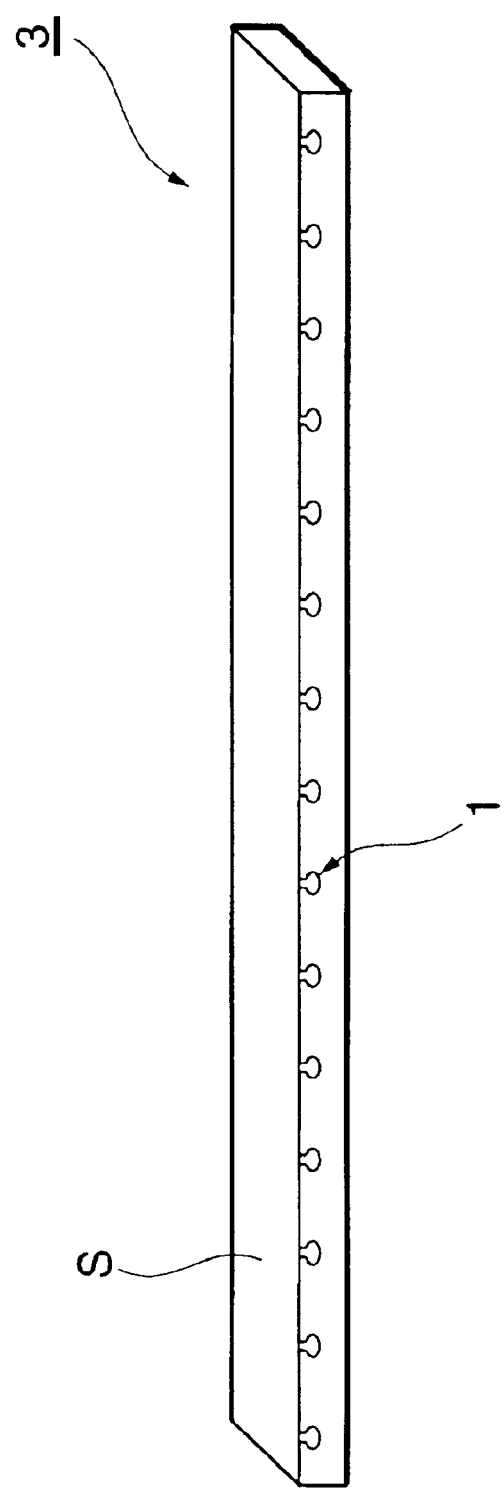
FIG. 2 is a view showing a bar after MR height adjustment.

The polishing in the lapping method in accordance with this embodiment refers to one applied to a medium-opposing surface in a thin-film magnetic head of the bar 3 in the stage shown in FIG. 1B before, after, or in the middle of lapping for adjusting the MR height or the like. The MR height refers to the distance in the depth direction of the magnetoresistive device for reproducing as seen from the medium-opposing surface. The medium-opposing surface is a surface opposing a recording surface of a hard disk, and is known as air bearing surface (ABS) in general. FIG. 2 shows a bar 3 after MR height adjustment.

The configuration of each thin-film magnetic head 1 to which the lapping method in accordance with this embodiment is applied will now be explained.

Figure 3:
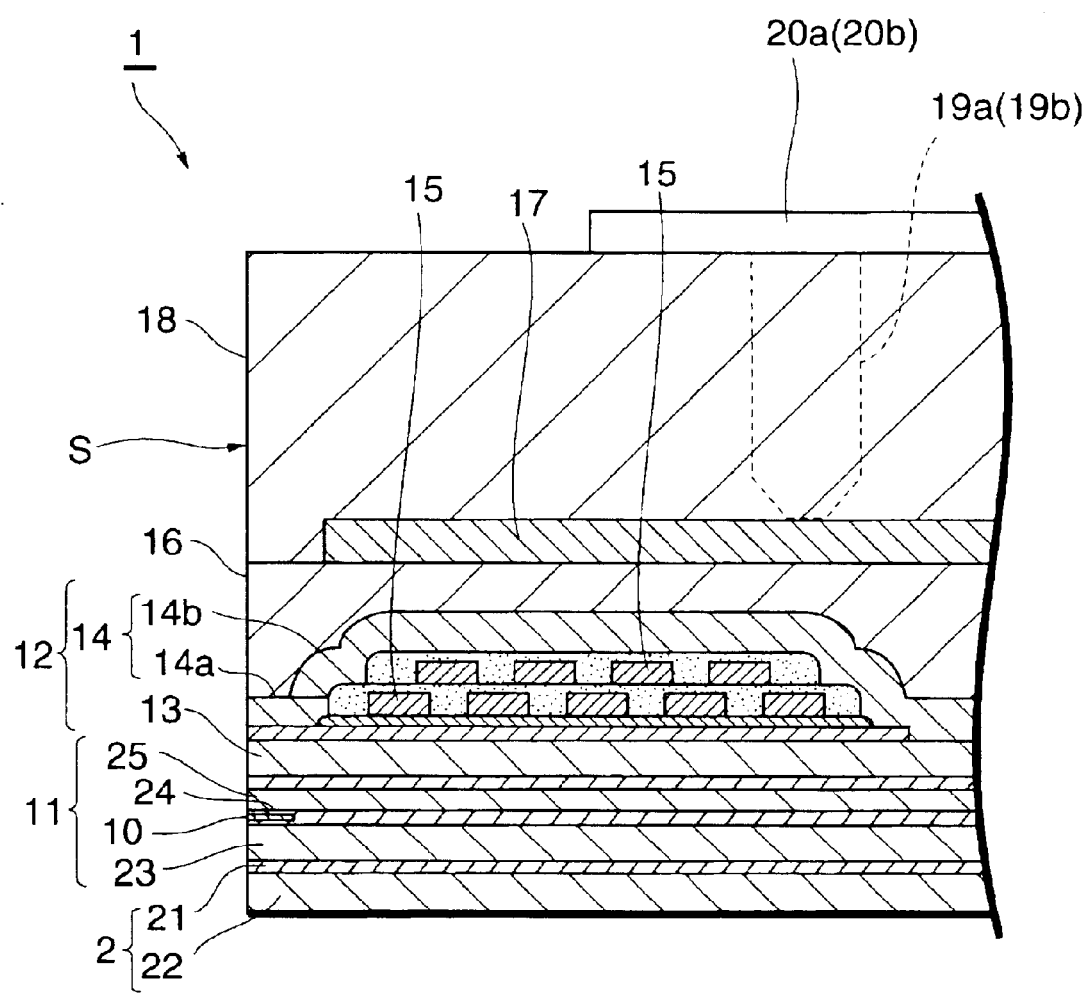
FIG. 3 is a schematic sectional view of the bar shown in FIG. 2 taken along a direction perpendicular to the medium-opposing surface S.

FIG. 3 is a schematic sectional view of the bar 3 taken along a direction perpendicular to the medium-opposing surface S in the thin-film magnetic head 1. In FIG. 3, the thin-film magnetic head 1 is a combination thin-film magnetic head in which a reproducing head part 11 having a GMR (Giant MagnetoResistive) device 10 for reproducing and a recording head part 12 acting as an inductive electromagnetic transducer for writing are laminated on the support 2. The GMR device utilizes a giant magnetoresistive effect yielding a high magnetoresistance change ratio. Here, AMR (Anisotropic MagnetoResistive) devices utilizing anisotropic magnetoresistive effects, TMR (Tunneling MagnetoResistive) devices utilizing magnetoresistive effects occurring at tunnel junctions, CPP-GMR devices, and the like may be used instead of the GMR device.

The support 2 is constructed by a substrate 22 made of AlTiC (Al$_2$O$_3$.TiC) or the like, and an undercoat layer 21 made of an insulating material such as alumina (Al$_2$O$_3$) formed thereon.

A lower shield layer 23 is formed on the undercoat layer 21, whereas the GMR device 10 is formed above the lower shield layer 23. The GMR device 10, which is constituted by a plurality of films in practice, is depicted as a single layer.

The GMR device 10 is surrounded by an insulating layer 24 made of Al$_2$O$_3$ or the like. On the insulating layer 24, an upper shield layer 25 is formed.

The recording head part 12 is the one for longitudinal recording, and mainly comprises a lower magnetic pole 13, an upper magnetic pole 14 magnetically coupled to the lower magnetic pole 13, and a thin-film coil 15 partly positioned between the lower magnetic pole 13 and upper magnetic pole 14.

The upper magnetic pole 14 is constituted by a magnetic pole part layer 14a located on the medium-opposing surface S side, and a yoke part layer 14b connected to the magnetic pole part layer 14a while bypassing the thin-film coil 15 thereunder.

An overcoat layer 16 is formed on the upper magnetic pole 14. Formed on the overcoat layer 16 is a heater 17 made of Cu, NiFe, Ta, Ti, CoNiFe alloy, FeAlSi alloy, or the like. The heater 17 functions to generate heat upon energization, so as to thermally expand layers thereabout, thus adjusting the gap between the GMR device 10 and a hard disk. An overcoat layer 18 is further formed on the heater 17.

Two conductive parts 19a, 19b made of an electrically conductive material such as Cu, each extending upward in the drawing, are electrically connected to the heater 17. Heater electrode pads 20a, 20b are attached to the conductive parts 19a, 19b at their upper ends (on the surface of the overcoat layer 18), respectively.

Similarly, two conductive parts (not depicted) made of an electrically conductive material are electrically connected to each of the reproducing head part 11 and recording head part 12, so as to connect with their corresponding reproducing and recording electrode pads at the upper ends of the conductive parts. The reproducing and recording electrode pads will be explained later.

Figure 4:
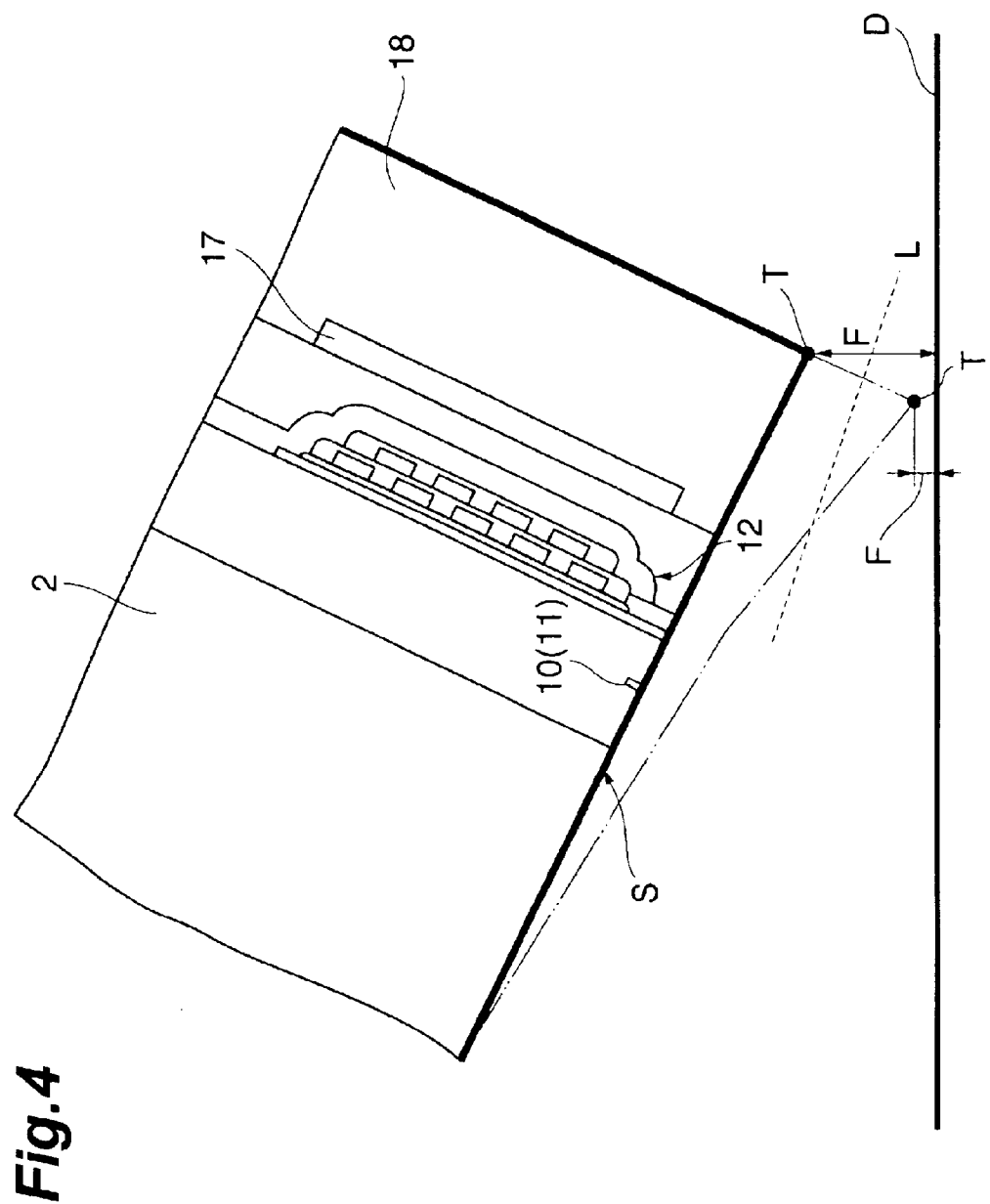
FIG. 4 is a view showing the relationship between the medium-opposing surface S of the thin-film magnetic head and a recording surface D of a hard disk.

FIG. 4 is a view showing the relationship between the medium-opposing surface S of the thin-film magnetic head 1 and a recording surface D of a hard disk.

When the heater 17 of the thin-film magnetic head 1 is energized, the medium-opposing surface S thermally expands in the vicinity of the heater 17, thereby projecting toward the recording surface D of the hard disk (as indicated by the dash-double-dot line in the drawing). Here, the vicinity of a corner T on the surface opposite from the support 2 in the overcoat layer 18 tends to project the farthest, thereby reducing the gap F between the medium-opposing surface S and the recording surface D of the hard disk. This causes a possibility of the corner T coming into contact with the recording surface D of the hard disk.

Therefore, in the lapping method of this embodiment, the overcoat layer 18 is polished from the corner T to the part indicated by a broken line L in FIG. 4 while in a state where the vicinity of the heater 17 in the medium-opposing surface S is expanded, i.e., in a state where the heater 17 is energized, before the thin-film magnetic head 1 is built into the hard disk drive.

The lapping method of this embodiment will now be explained specifically.

Figure 5:
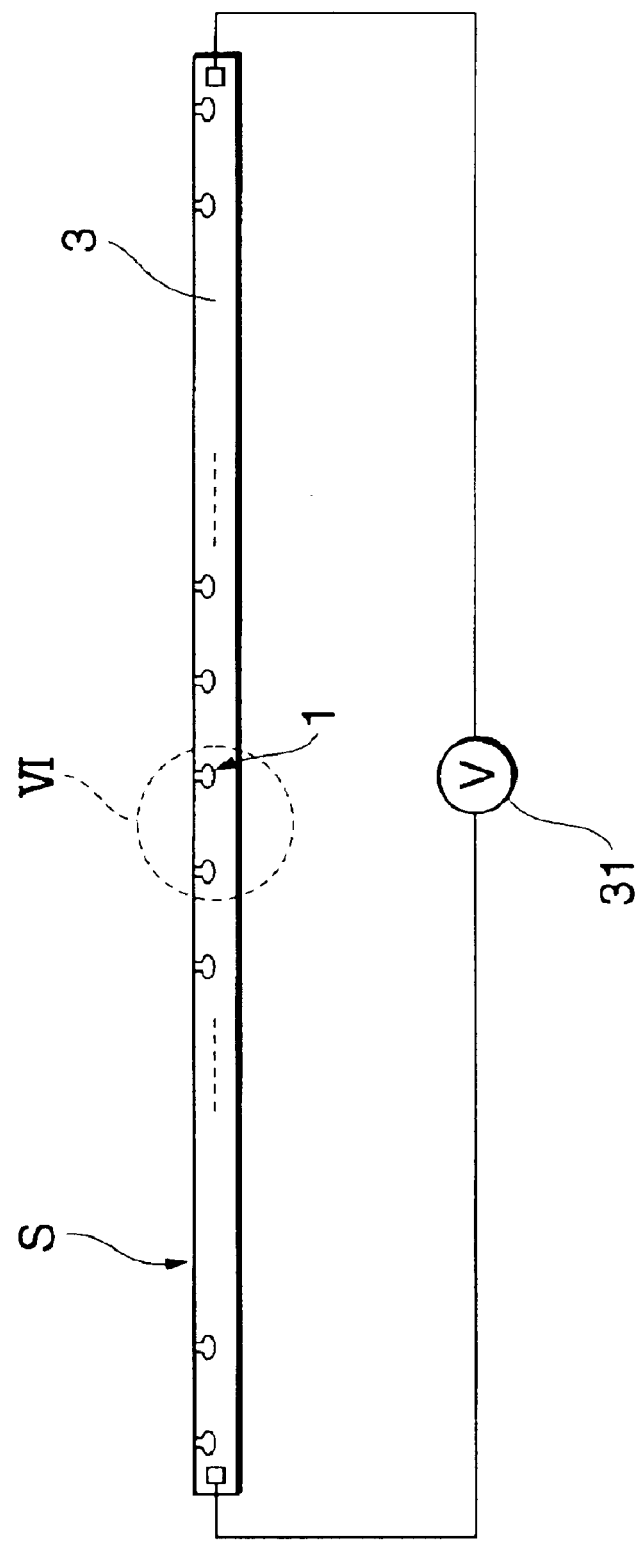
FIG. 5 is a schematic view showing a state in which an external power supply is connected to the bar shown in FIG. 2.

FIG. 5 is a schematic view showing a state in which an external power supply 31 is connected to the bar 3 shown in FIG. 2. In this embodiment, the heater 17 of each thin-film magnetic head 1 in the bar 3 is energized when the external power supply 31 is turned ON.

Figure 6:
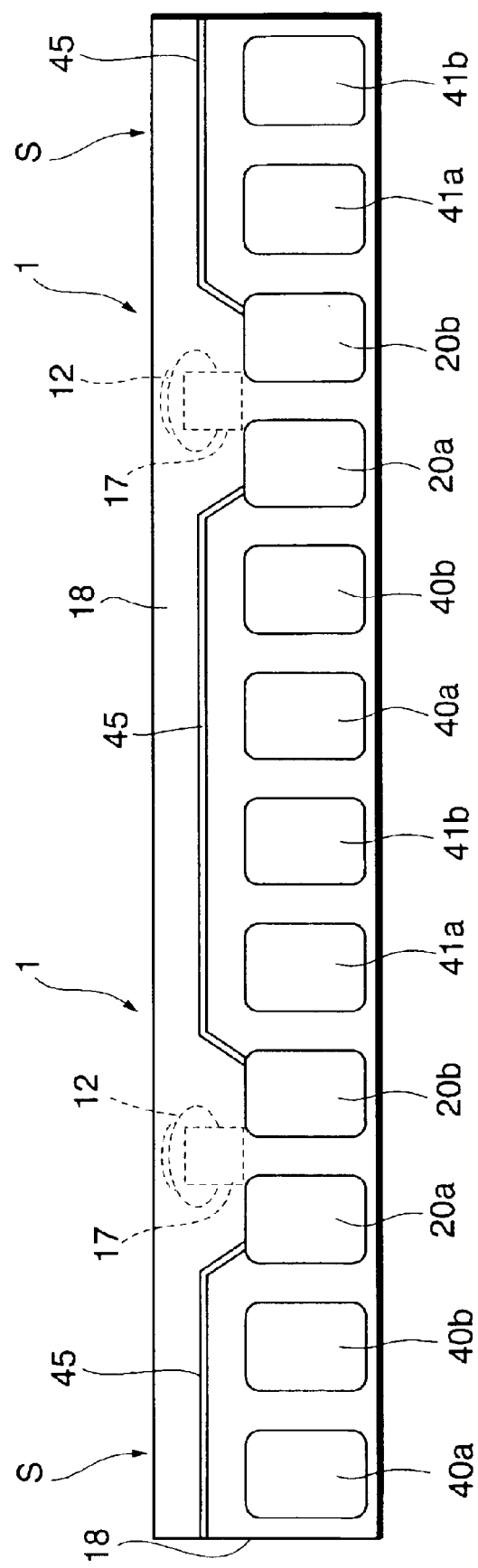
FIG. 6 is a partly enlarged view of a region VI in the bar shown in FIG. 5.

FIG. 6 is a partly enlarged view of a region VI of the bar 3 shown in FIG. 5, illustrating two thin-film magnetic heads 1 arranged in a row. As depicted, recording electrode pads 40a, 40b, heater electrode pads 20a, 20b, and reproducing electrode pads 41a, 41b are attached onto the overcoat layer 18 of each thin-film magnetic head 1. Though the recording electrode pads 40a, 40b, heater electrode pads 20a, 20b, and reproducing electrode pads 41a, 41b are provided successively from the left in the drawing, this order is not restrictive. For example, the positions of the recording electrode pads 40a, 40b may be exchanged with those of the reproducing electrode pads 41a, 41b. The positions of the heater electrode pads 20a, 20b are not restricted to the depicted mode, but may be arranged on the outside of the recording electrode pads 40a, 40b and reproducing electrode pads 41a, 41b, for example.

The heater electrode pads 20a, 20b of the thin-film magnetic heads 1 adjacent each other are electrically connected to each other by a wire 45, for example. Therefore, all the thin-film magnetic heads 1 in the bar 3 are electrically connected to each other, whereby the heaters 17 of all the thin-film magnetic heads 1 in the bar 3 are energized when the external power supply 31 shown in FIG. 5 is turned ON. This can reduce energizing equipment such as external power supplies.

Figure 7A:
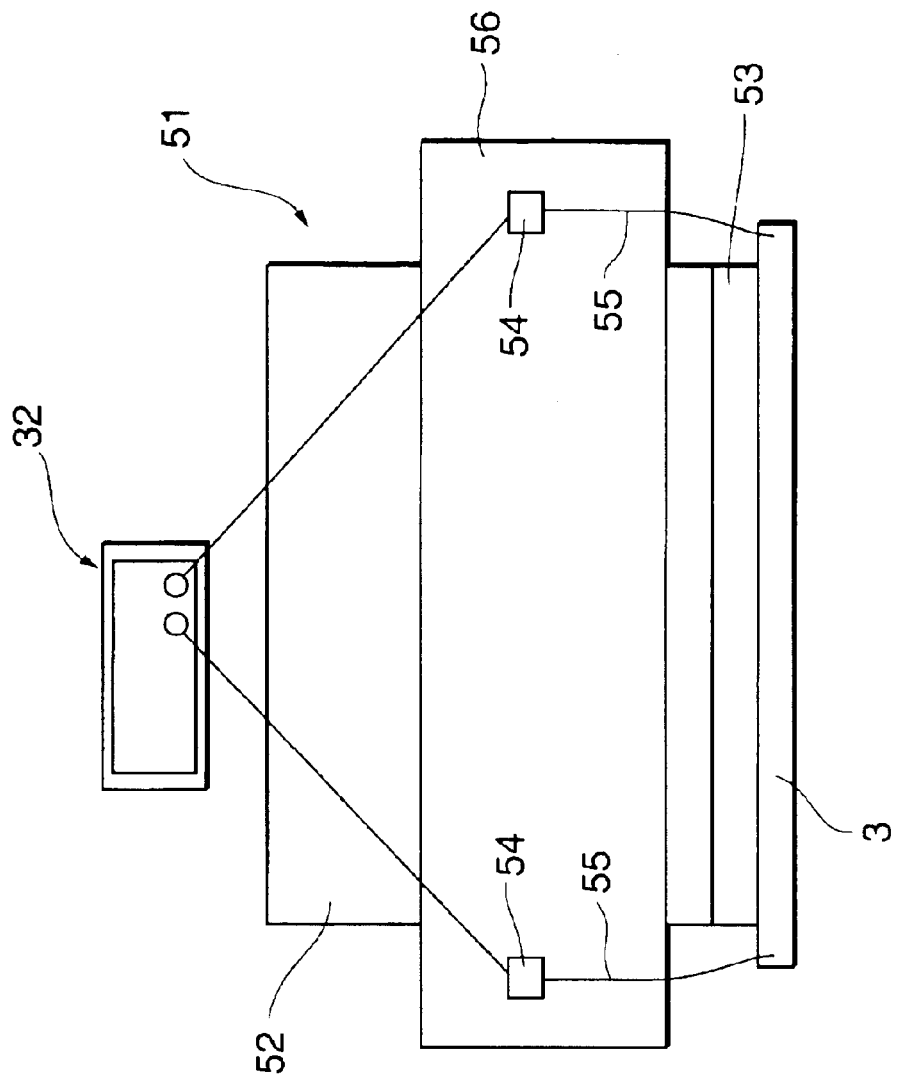
FIGS. 7A and 7B are views showing a bar holding device constituting a lapping apparatus employed in the lapping method in accordance with the first embodiment of the present invention.
Figure 7B:
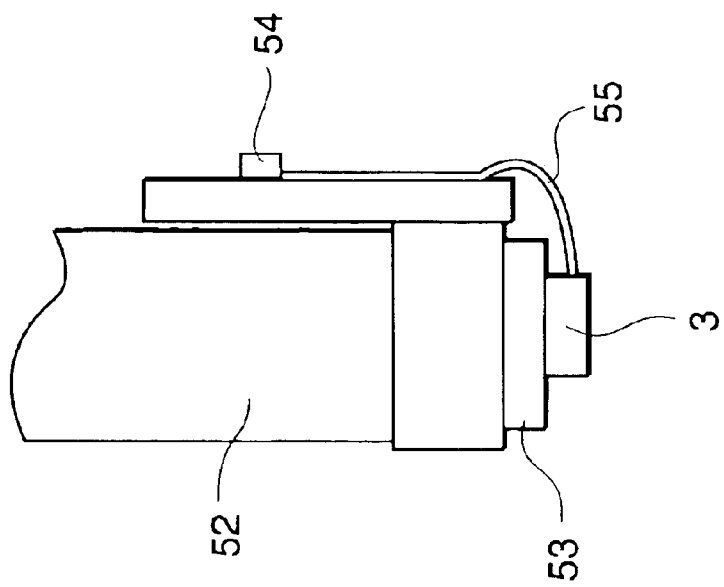

FIG. 7A is a front view showing a bar holding device 51 constituting a lapping apparatus employed in the lapping method in accordance with this embodiment, whereas FIG. 7B is a side view thereof. The lapping apparatus is constituted by the holding device 51 and a polisher 61 shown in FIG. 8 which will be explained later.

As shown in FIGS. 7A and 7B, the bar holding device 51 comprises a main part 52 and a holding rubber part 53, disposed thereunder, for holding the bar 3. The main part 52 includes an energizing part 56 comprising a pair of electrodes 54 and a pair of wires 55 for energizing the bar 3. The wires 55 are connected to the electrodes 54 and the bar 3 attached to the holding rubber part 53. The electrodes 54 are electrically connected to the external power supply 32, so that the power from the external power supply 32 is supplied to the bar 3 by way of the wires 55.

FIG. 8 is a view showing a lapping step for the bar 3. For lapping, the bar 3 is initially attached to the holding rubber part 53 of the bar holding device 51. Subsequently, the bar holding device 51 is moved down while the heaters 17 of the thin-film magnetic heads 1 in the bar 3 are energized, so that the bar 3 comes into contact with the rotary polishing surface R in the polisher 61. Then, the overcoat layer 18 is polished from the corner T to the part indicated by the broken line L in FIG. 4.

Figure 9:
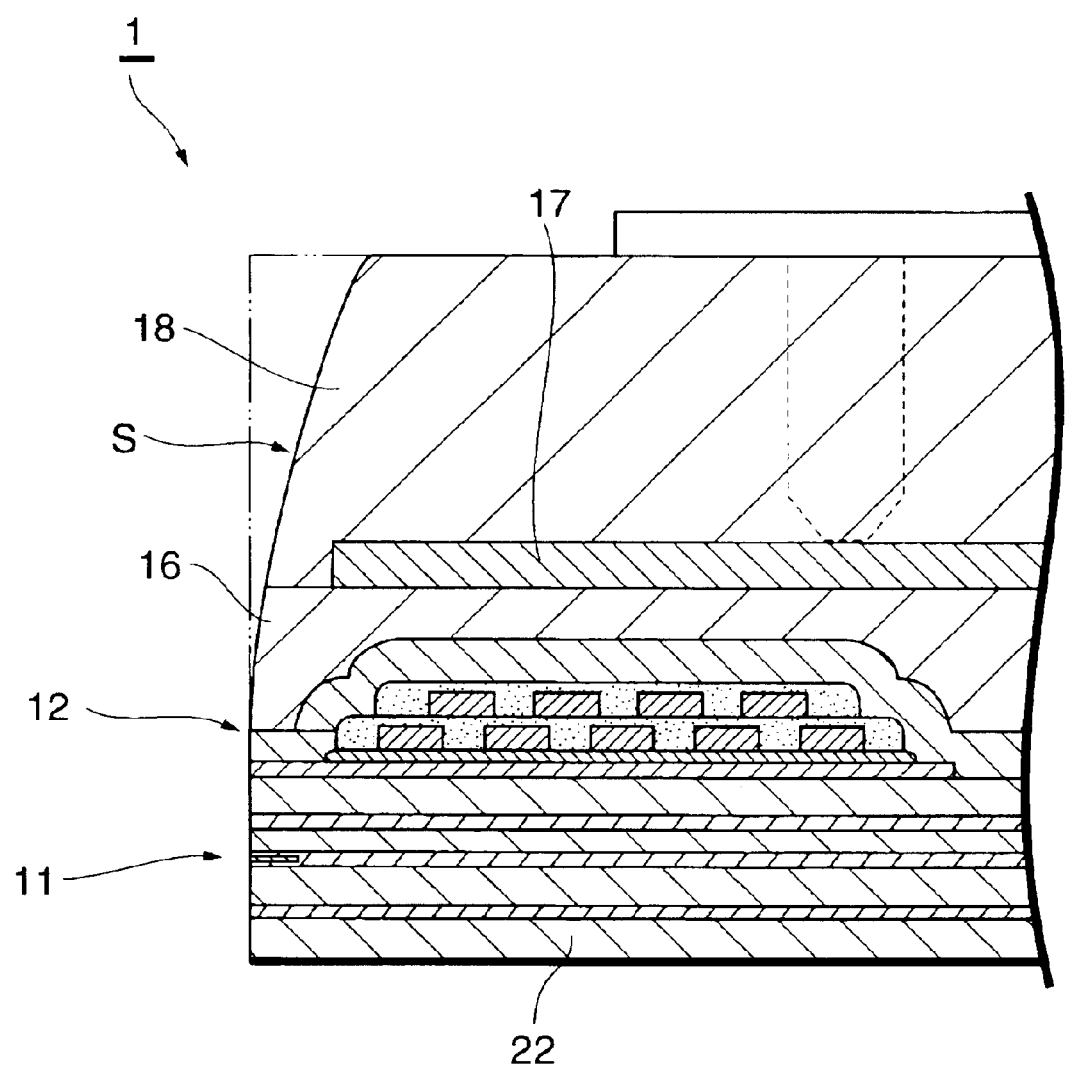
FIG. 9 is a schematic sectional view of the thin-film magnetic head after lapping.

FIG. 9 is a schematic sectional view of the thin-film magnetic head 1 taken along a direction perpendicular to the medium-opposing surface S after lapping. The dash-double-dot line indicates the part shaved off by the lapping. FIG. 9 shows only an example of form after lapping. A region extending from the corner T of the overcoat layer 18 to the recording head part 12 or reproducing head part 11 may be polished in some cases.

Lapping the thin-film magnetic head 1 as in the foregoing can set the flying height of the thin-film magnetic head 1 to an appropriate amount even if the medium-opposing surface S expands when the recording head part 12 is energized. This can prevent the thin-film magnetic head 1 and the recording surface D of the hard disk from crushing against each other, thereby making it possible for the thin-film magnetic head 1 to realize lower levitation.

The method of energizing the heaters 17 is not limited to the mode shown in FIG. 6. For example, without providing heater electrode pads on the overcoat layer 18 of the thin-film magnetic heads 1, the heaters 17 of the thin-film magnetic heads 1 adjacent each other may be directly connected to each other by an embedded wire 45 as shown in FIG. 10.

As shown in FIG. 11, the heater electrode pads 20a, 20b may be connected to an external power supply 70 for each thin-film magnetic head 1. This allows the medium-opposing surfaces S of the thin-film magnetic heads 1 to change their amounts of expansion separately from each other, thus making it possible to adjust amounts of polishing in the individual thin-film magnetic heads 1. Also, a step of placing the wiring necessary for connecting heaters 17 to each other and the like can be omitted.

FIG. 12A is a front view showing the bar holding device 51 in the mode shown in FIG. 11, whereas FIG. 12B is a side view thereof. For energizing the heaters 17 of the thin-film magnetic heads 1 in the bar 3, it will be sufficient if wires 55 electrically connected to the external power supply 32 are connected to the individual heater electrode pads 20a, 20b as shown in FIGS. 12A and 12B. As a consequence, a step of providing the wiring for connecting the heaters 17 to each other is unnecessary in the bar 3. It is also advantageous in that amounts of energization of the thin-film magnetic heads 1 can be changed individually, so that the medium-opposing surfaces S can vary their amounts of expansion separately from each other.

The position of the heater 17 is not limited to that shown in FIG. 4. The heater 17 may be located behind the recording head part 12 as seen from the medium-opposing surface S, for example. Preferably, the reproducing head part 11, recording head part 12, and heater 17 are laminated in this order from the support 2 side as shown in FIG. 4. Namely, it is preferred that the heater 17 be positioned closer to the recording head part 12 than the reproducing head part 11. When the thin-film coil 15 is energized at the time of recording onto the hard disk, the surroundings of the recording head part 12 are expanded by the heat generated, whereby the vicinity of the recording head part 12 comes the closest to the hard disk. Therefore, polishing the most expandable part while expanding it with the heater 17 can prevent the thin-film magnetic head 1 and the recording surface D of the hard disk from crushing against each other. When the heater 17 is disposed within the overcoat layer 18 as shown in FIG. 4, the heater 17 may be located at any position within the overcoat layer 18 regardless of the distance from the medium-opposing surface S or recording head part 12.

Figure 13:
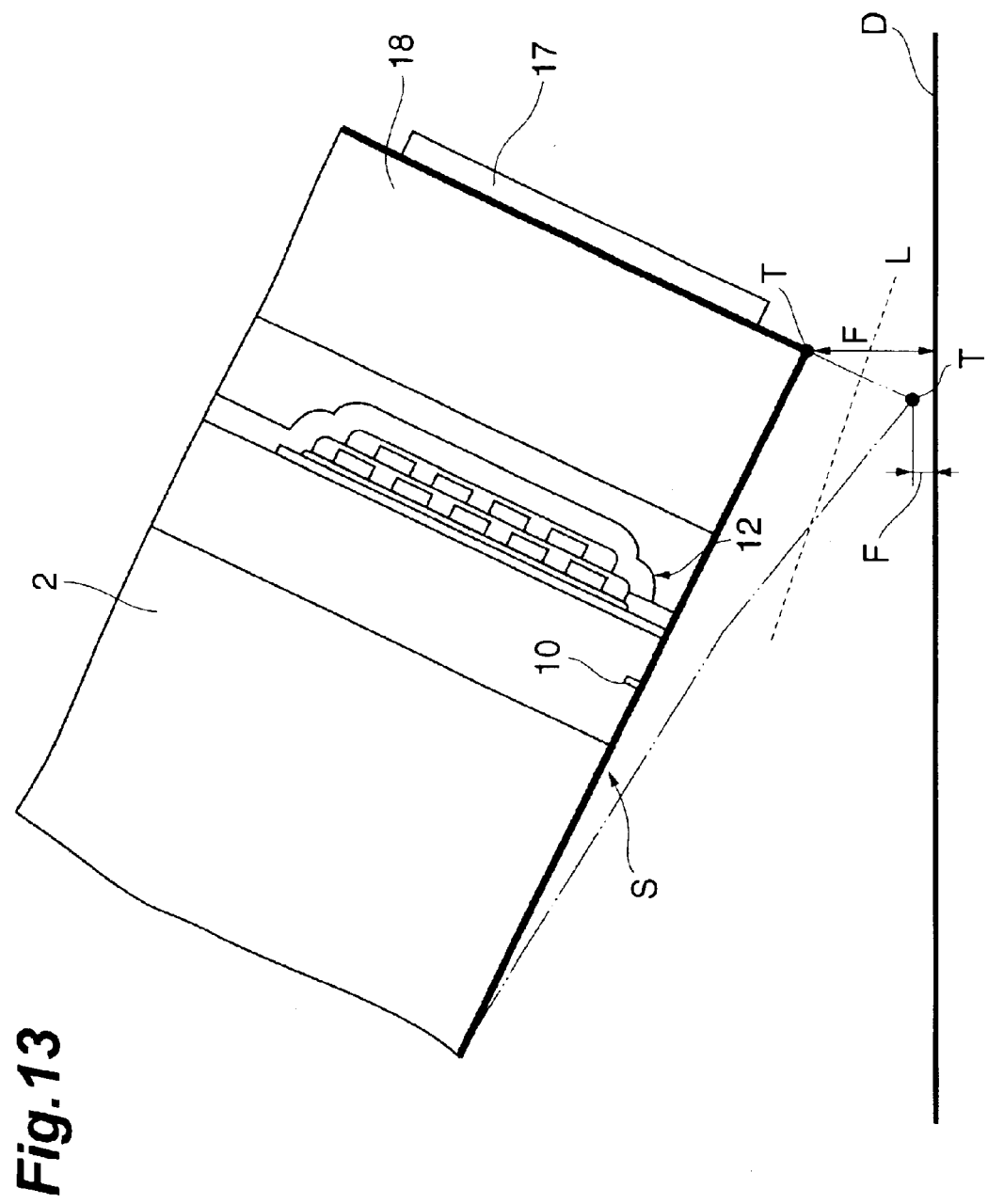
FIG. 13 is a view showing another example of heater position in the thin-film magnetic head.

Though the heater 17 is disposed within the overcoat layer 18 of the thin-film magnetic head 1 in this embodiment, the heater 17 may be bonded by an adhesive or the like onto the surface of the overcoat layer 18 on the side opposite from the support 2 as shown in FIG. 13. This makes it unnecessary to form the heater 17 within the thin-film magnetic head 1, thus facilitating the making of the thin-film magnetic head 1. Employing a configuration in which the heater 17 is bonded as such can yield an effect similar to that obtained when the heater 17 is disposed within the overcoat layer 18 of the thin-film magnetic head 1. Namely, as shown in FIG. 13, the medium-opposing surface S can be expanded in the vicinity of the heater 17 when the heater 17 is caused to generate heat upon energization.

Figure 14:
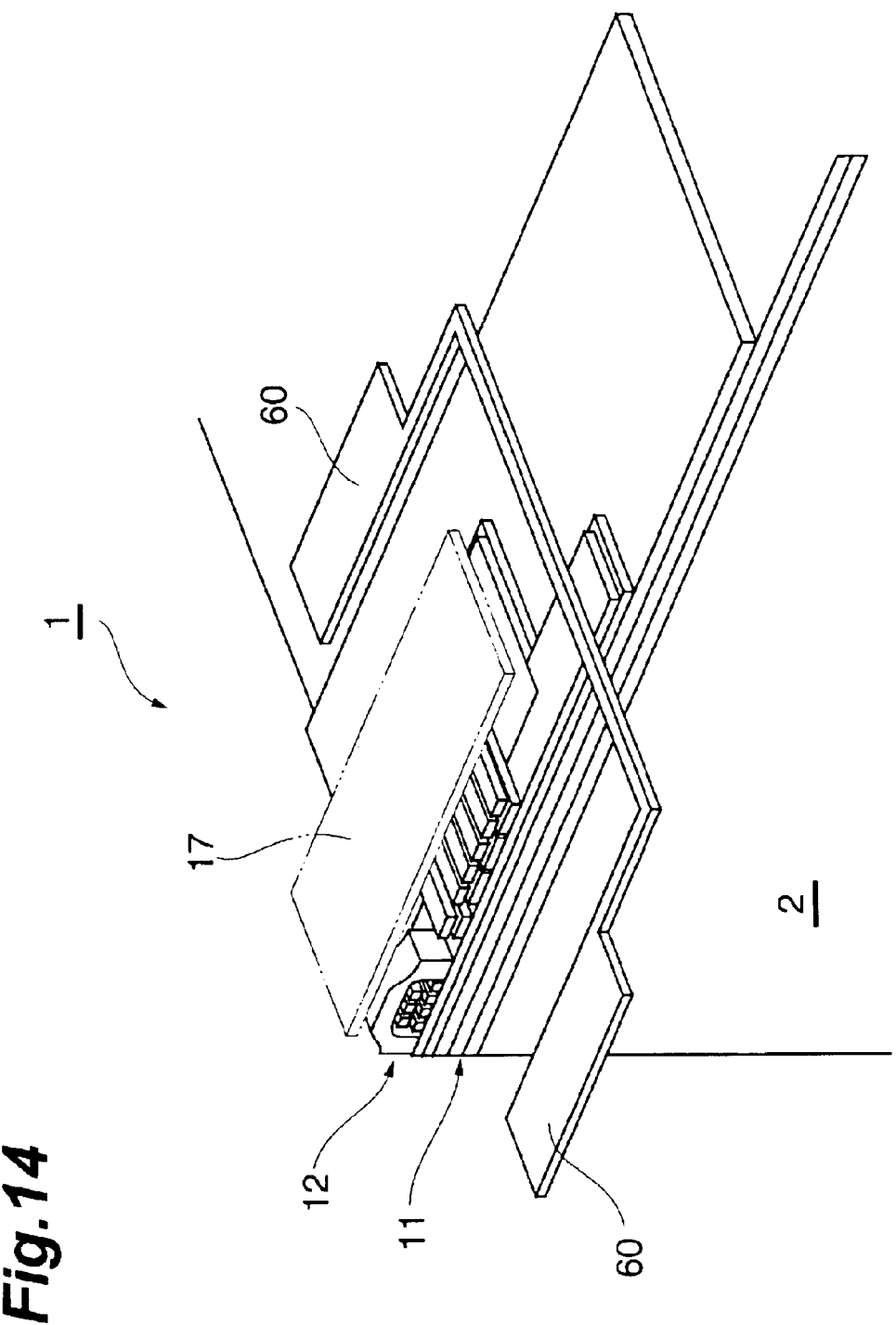
FIG. 14 is a schematic sectional view showing an example of thin-film magnetic head 1 in which heaters are arranged in a divided fashion.

A single heater 17 may be disposed at the above-mentioned position, or a plurality of heaters 17 may be arranged in a divided fashion. FIG. 14 is a schematic sectional view showing an example of thin-film magnetic head 1 in which two heaters are arranged in a divided fashion. In this drawing, the heaters 60 arranged in a divided fashion are located at the same height as with the heater 17 disposed within the overcoat layer 18 shown in FIG. 3.

The heater 17 provided in the thin-film magnetic head 1 in accordance with this embodiment may be used for generating heat upon energization at the time of recording/reproducing with respect to a hard disk, so as to expand the medium-opposing surface S in the vicinity of the reproducing head part 11, thereby adjusting the gap between the reproducing head part 11 and the hard disk. Alternatively, the heater 17 may be used only for expanding the medium-opposing surface when carrying out the lapping in accordance with this embodiment but not when operating the hard disk drive.

[Second Embodiment] A second embodiment of the present invention will now be explained. The lapping method of this embodiment differs from that of the first embodiment in that the recording head part 12 is caused to generate heat upon energization instead of the heater 17 in the thin-film magnetic head 1.

In the lapping method in accordance with the second embodiment, before the thin-film magnetic head 1 is built into the hard disk drive, the recording head part 12 is caused to generate heat upon energization, so as to project the medium-opposing surface S, and the projected part of the medium-opposing surface S is polished in this state.

As a consequence, the part of medium-opposing surface S expandable by the heat generated by the recording head part 12 at the time of actual recording onto the hard disk is eliminated beforehand, whereby the flying height of the thin-film magnetic head 1 can be set to an appropriate value. This can prevent the thin-film magnetic head 1 and the recording surface D of the hard disk from crushing against each other, and make it possible for the thin-film magnetic head to realize lower levitation.

Figure 15:
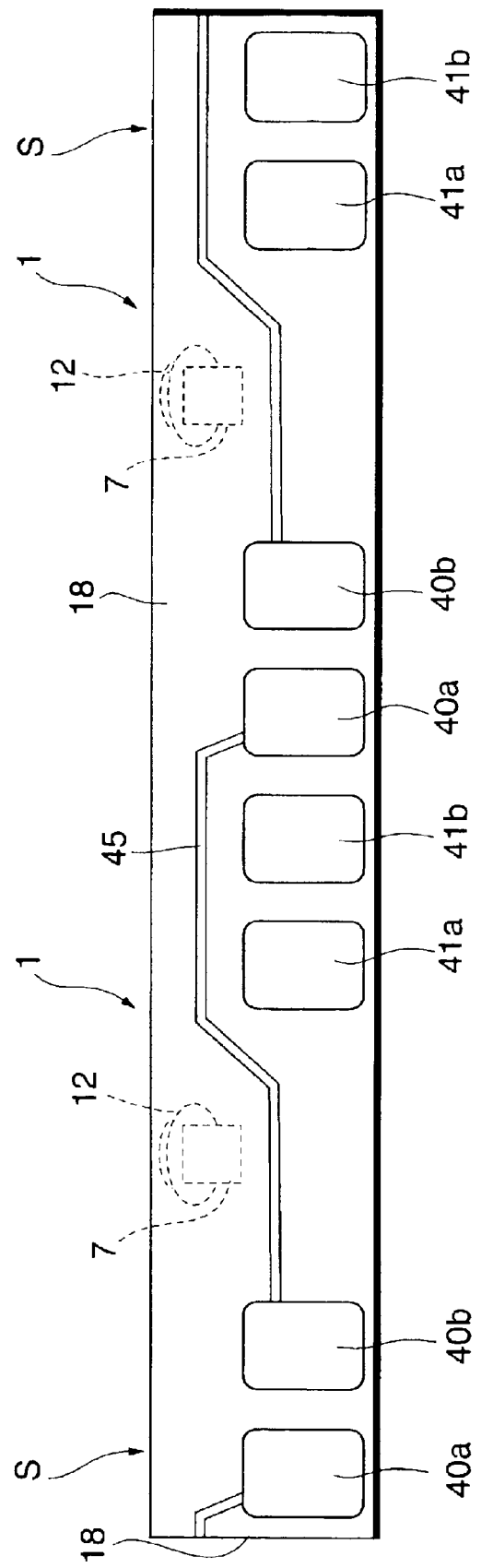
FIG. 15 is a view showing a second embodiment of the present invention, illustrating a mode of energizing a recording head part.

FIG. 15 is a view showing a mode of energization of the recording head part 12 in this embodiment. In this drawing, recording electrode pads 40a, 40b are electrically connected to the recording head part 12 by a wire 45, for example, between thin-film magnetic heads 1 adjacent each other. Therefore, the respective recording heads 12 of all the thin-film magnetic heads 1 in the bar 3 are electrically connected to each other, so that the recording head parts 12 of all the thin-film magnetic heads 1 in the bar 3 are energized when the external power supply 31 shown in FIG. 5 is turned ON. This can polish the medium-opposing surfaces S of a plurality of thin-film magnetic heads 1 at once, thereby reducing energizing equipment such as external power supplies.

Figure 16:
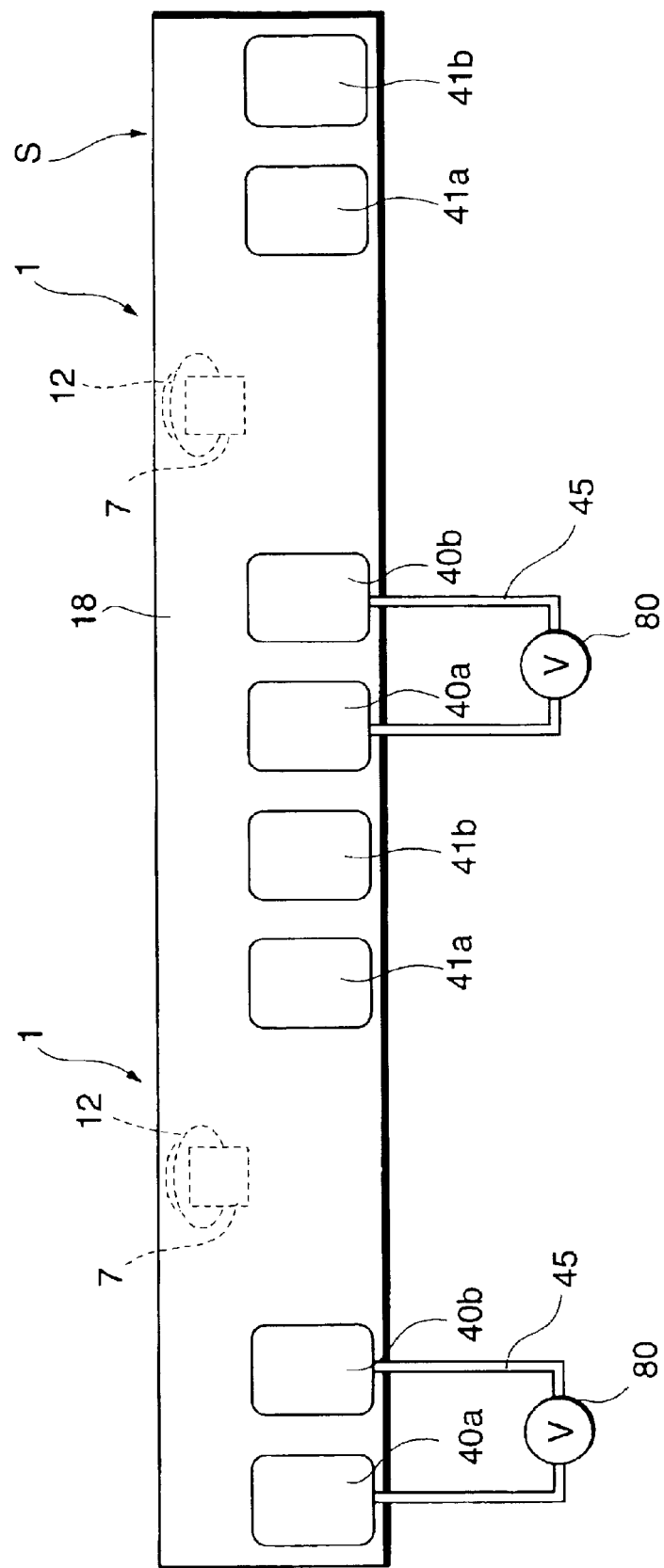
FIG. 16 is a view showing another example of the mode of energizing the recording head part in accordance with the second embodiment of the present invention.

FIG. 16 is a view showing another example of mode of energizing the recording heat part 12 in this embodiment. As shown in this drawing, the recording electrode pads 40a, 40b may be connected to an external power supply 80 for each thin-film magnetic head 1. This allows the medium-opposing surfaces S of the thin-film magnetic heads 1 to change their amounts of expansion separately from each other, thus making it possible to adjust amounts of polishing in the individual thin-film magnetic heads 1. Also, a step of placing the wiring necessary for connecting the recording head parts 12 to each other and the like can be omitted, so as to facilitate the making of the thin-film magnetic heads 1.

Figure 17:
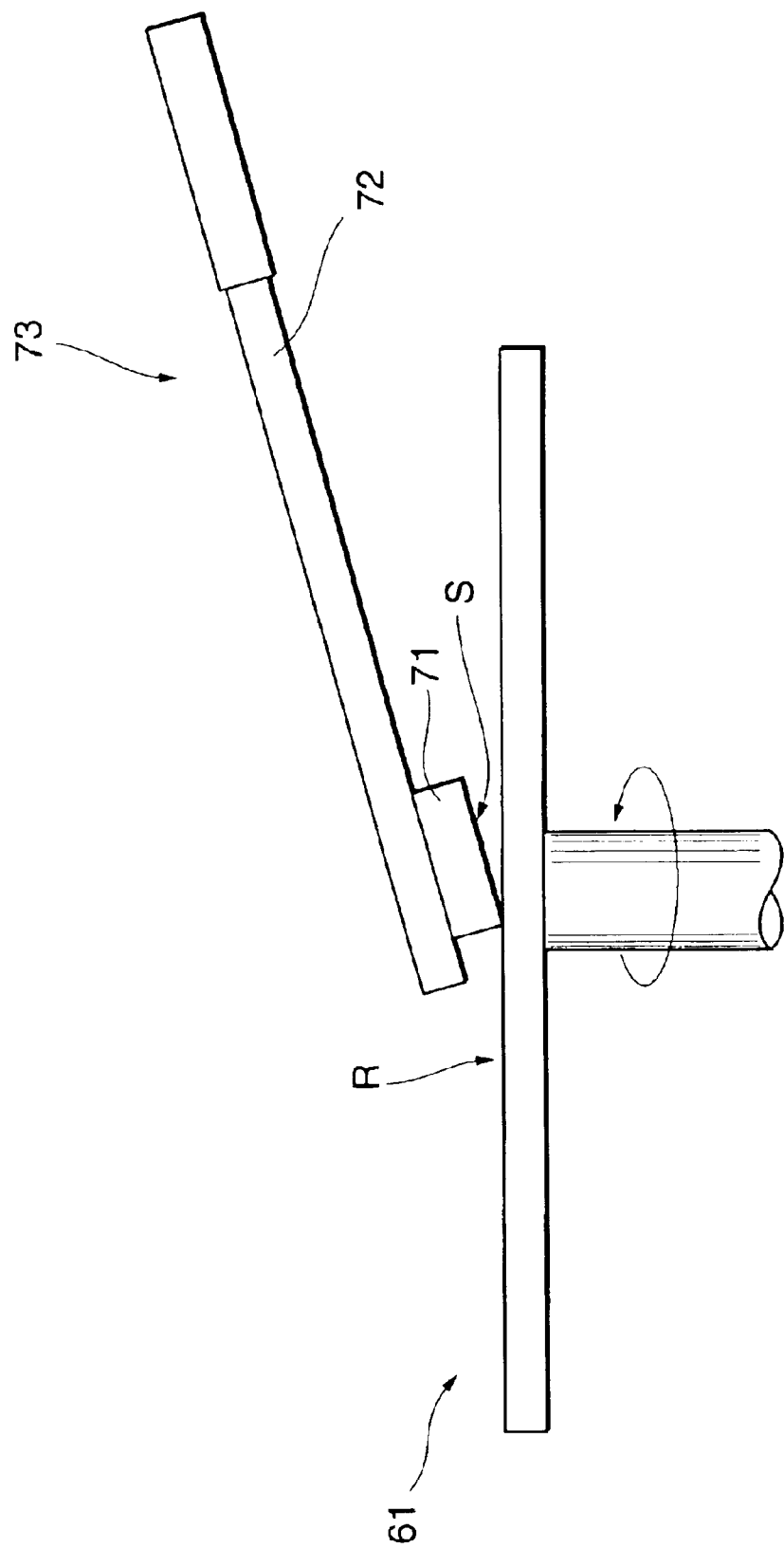
FIG. 17 is a schematic view showing a third embodiment of the present invention, illustrating a lapping step in a state in which a head gimbal assembly is constructed.

[Third Embodiment] A third embodiment of the present invention will now be explained. FIG. 17 is a schematic view showing the lapping in a state where a head gimbal assembly is assembled. Though the medium-opposing surfaces S of thin-film magnetic heads 1 are polished while in the state of a bar 3 in which the thin-film magnetic heads 1 are arranged in a row in the first and second embodiments, the medium-opposing surface S of each thin-film magnetic head 1 may be polished while in the state of a head gimbal assembly as shown in FIG. 17.

Namely, the bar 3 is cut, so as to form head sliders 71 each including a thin-film magnetic head 1, and each head slider 71 is mounted to an arm member 72 such as a suspension, so as to produce a head gimbal assembly 73. While in this state, the medium-opposing surface S of the thin-film magnetic head 1 is polished while energizing the heater 17 or recording head part 12. This can polish the medium-opposing surface S of the thin-film magnetic head 1 in a state closer to the case actually mounted in a hard disk drive, whereby optimal amounts of polishing can be carried out in the individual thin-film magnetic heads. Therefore, the thin-film magnetic head 1 and hard disk can more reliably be prevented from crushing against each other.

Next, an example of the present invention will be explained with reference to the graph of FIG. 18. In this example, thin-film magnetic heads employing the lapping method in accordance with the present invention (having the configuration shown in FIG. 9) and thin-film magnetic heads not subjected to lapping (substantially having the configuration shown in FIG. 3) were prepared. Subsequently, after the thin-film magnetic heads were levitated on the recording surface of a hard disk, their heaters were energized, so as to gradually increase the voltage applied to the heaters. Then, the voltage applied until the thin-film magnetic head came in contact with the hard disk as being expanded by the heat generated was measured.

Figure 18:
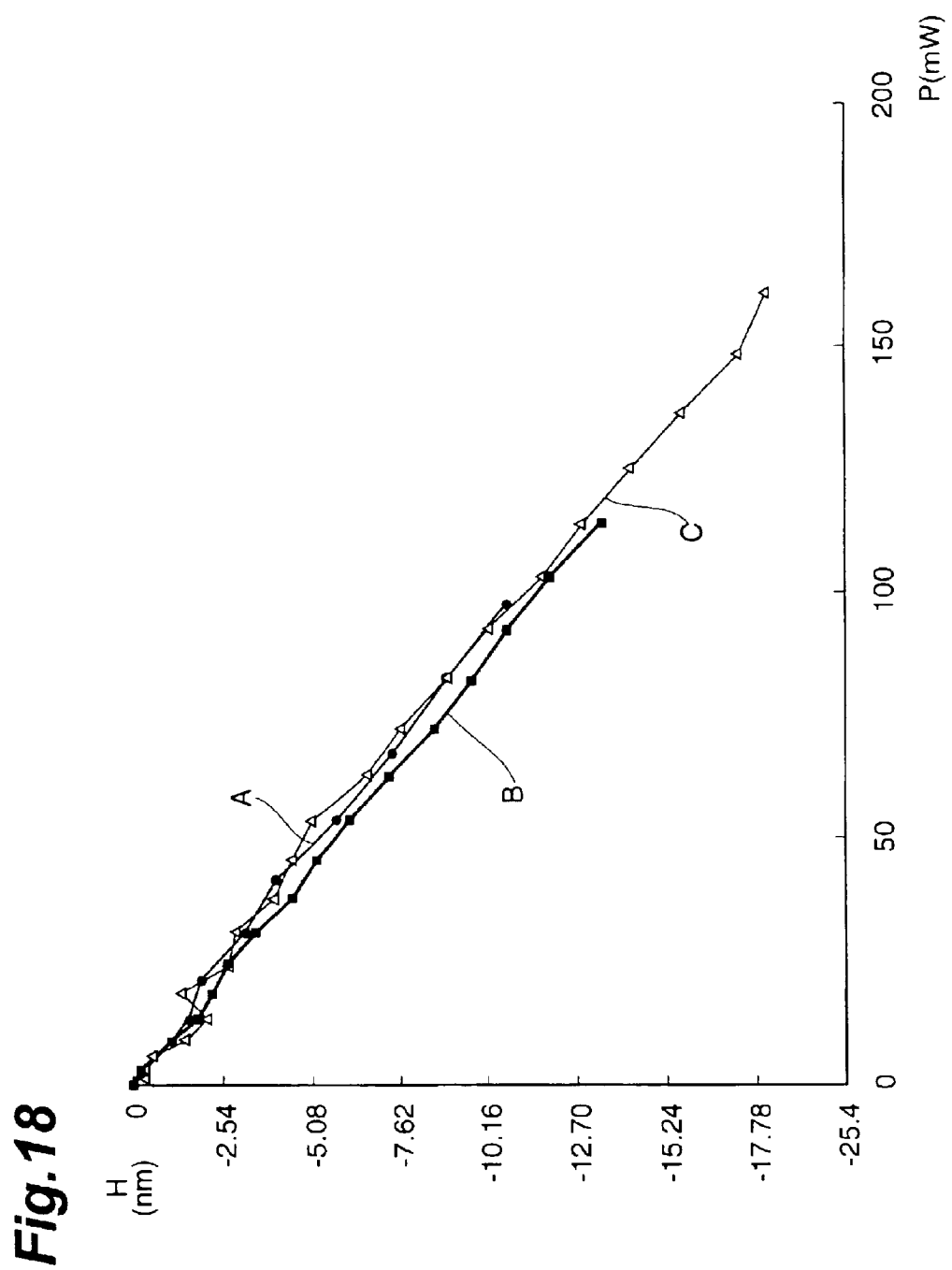
FIG. 18 is a graph showing results of experiments.

In FIG. 18, the ordinate indicates the positional relationship between a recording surface of a hard disk and the reproducing head part of each thin-film magnetic head. The distance from the hard disk to the reproducing head part in the state not energizing the heater was set to 0, whereas the value H (nm) by which the flying height was reduced when the heater was energized is indicated with a minus sign added thereto. Namely, the greater is the absolute value on the ordinate, the smaller is the flying height of the thin-film magnetic head from the hard disk. On the other hand, the abscissa indicates the value of power P (mW) applied to the heater.

Experiment 1 employed the thin-film magnetic heads not subjected to lapping (results thereof being indicated by line A). Experiment 2 employed the thin-film magnetic heads whose medium-opposing surfaces were lapped by 2.5 nm (results thereof being indicated by line B). Experiment 3 employed the thin-film magnetic heads whose medium-opposing surfaces were lapped by 7.5 nm (results thereof being indicated by line C).

In Experiment 1, as can be seen from line A, the leading end part of the thin-film magnetic head abutted against the recording surface of the hard disk at a point where the applied power value P was about 100 mW, so that the distance H between the reproducing head part and the recording surface of the hard disk could not be made shorter from there.

In Experiment 2, as can be seen from line B, the leading end part of the thin-film magnetic head abutted against the recording surface of the hard disk at a point where the applied power value P was about 120 mW, so that the distance H between the reproducing head part and the recording surface of the hard disk became shorter than that in line A.

In Experiment 3, as can be seen from line C, the voltage could be applied up to about 160 mW, whereby the distance H between the reproducing head part and the recording surface of the hard disk became shortest.

The foregoing has verified that the distance H between the reproducing head part and the recording surface of the hard disk can be made shorter as the amount of lapping is greater. Therefore, lapping the medium-opposing surface of a thin-film magnetic head can improve recording and reproducing performances of the thin-film magnetic head.

Though the present invention is specifically explained with reference to the embodiments in the foregoing, the present invention is not limited to the above-mentioned embodiments. For example, though the thin-film magnetic heads employ the in-plane recording scheme in the above-mentioned embodiments, the present invention is also applicable to thin-film magnetic heads of perpendicular recording type.

Since the medium-opposing surface of a thin-film magnetic head is lapped while energizing a heater or electromagnetic transducer, the present invention can prevent the thin-film magnetic head and a hard disk from crushing against each other and thereby achieve lower levitation in the thin-film magnetic head.

The basic Japanese Application No. 2003-57436 filed on Mar. 4, 2003 is hereby incorporated by reference.

What is claimed is:

1. A method of lapping a medium-opposing surface in a thin-film magnetic head, the method comprising the steps of:
   providing the thin-film magnetic head formed on a support, the thin-film magnetic head comprising a magnetoresistive device for reproducing, an inductive electromagnetic transducer for writing, and a heater for generating heat when energized; and
   polishing a medium-opposing surface of the thin-film magnetic head while energizing the heater.

2. A method of lapping a medium-opposing surface in a thin-film magnetic head according to claim 1, wherein the magnetoresistive device, inductive electromagnetic transducer, and heater are laminated successively from the support side in the thin-film magnetic head.

3. A method of lapping a medium-opposing surface in a thin-film magnetic head according to claim 1, wherein the heater is disposed on a surface of the thin-film magnetic head opposite from the support.

4. A method of lapping a medium-opposing surface in a thin-film magnetic head according to claim 1, the method comprising the steps of:
   cutting the support so as to form a bar including thin-film magnetic heads arranged in a row; and
   polishing medium-opposing surfaces of the thin-film magnetic heads in the bar while energizing the heater.

5. A method of lapping a medium-opposing surface in a thin-film magnetic head according to claim 4, the method comprising the steps of:
   electrically connecting a plurality of heaters of the thin-film magnetic heads to each other; and
   polishing the medium-opposing surfaces of the thin-film magnetic heads while energizing all the heaters in the bar with a single power supply.

6. A method of lapping a medium-opposing surface in a thin-film magnetic head according to claim 4, wherein a plurality of heaters of the thin-film magnetic heads in the bar are energized individually.

7. A method of lapping a medium-opposing surface in a thin-film magnetic head according to claim 1, the method comprising the steps of:
   cutting the support so as to form a bar including thin-film magnetic heads arranged in a row;
   cutting the bar so as to form a plurality of head sliders each having a thin-film magnetic head;
   mounting the head slider to an arm member so as to form a head gimbal assembly; and
   polishing the medium-opposing surface of the thin-film magnetic head in thus obtained state while energizing the heater.

8. A method of lapping a medium-opposing surface in a thin-film magnetic head, the method comprising the steps of:
   providing the thin-film magnetic head formed on a support, the thin-film magnetic head comprising a magnetoresistive device for reproducing and an inductive electromagnetic transducer for writing; and
   polishing a medium-opposing surface of the thin-film magnetic head while energizing the electromagnetic transducer to produce a heat effect.

9. A method of lapping a medium-opposing surface in a thin-film magnetic head according to claim 8, the method comprising the steps of:
   cutting the support so as to form a bar including thin-film magnetic heads arranged in a row; and
   polishing medium-opposing surfaces of the thin-film magnetic heads in the bar while energizing the electromagnetic transducer.

10. A method of lapping a medium-opposing surface in a thin-film magnetic head according to claim 9, the method comprising the steps of:
    electrically connecting a plurality of electromagnetic transducers of the thin-film magnetic heads to each other; and
    polishing the medium-opposing surfaces of the thin-film magnetic heads while energizing all the electromagnetic transducers in the bar with a single power supply.

11. A method of lapping a medium-opposing surface in a thin-film magnetic head according to claim 9, wherein a plurality of electromagnetic transducers of the thin-film magnetic heads in the bar are energized individually.

12. A method of lapping a medium-opposing surface in a thin-film magnetic head according to claim 8, the method comprising the steps of:
    cutting the support so as to form a bar including thin-film magnetic heads arranged in a row;
    cutting the bar so as to form a plurality of head sliders each having a thin-film magnetic head;
    mounting the head slider to an arm member so as to form a head gimbal assembly; and
    polishing the medium-opposing surface of the thin-film magnetic head in thus obtained state while energizing the electromagnetic transducer.

* * * * *